United States Patent [19]
Vinet

[11] 3,933,231
[45] Jan. 20, 1976

[54] AUTOMATIC WORKSHOP INSTALLATION

[76] Inventor: Herbert Paul Vinet, 12, rue Paul Redoute, Meudon-la-Foret, France, 92360

[22] Filed: Aug. 12, 1974

[21] Appl. No.: 497,146

[30] Foreign Application Priority Data
Oct. 5, 1973 France .................... 73.35617

[52] U.S. Cl. .......... 194/1 R; 194/9 T; 194/DIG. 18; 116/35 R; 340/51; 340/280
[51] Int. Cl.² ........................................ G07F 17/00
[58] Field of Search .......... 194/2, 1 R, 9 R, 9 T, 11, 194/16, DIG. 18, DIG. 23; 116/28 R, 31, 35 R, 35 A, 67 R, 114 R, 114 E; 340/23, 51, 31, 61, 70, 272, 280, 282

[56] References Cited
UNITED STATES PATENTS

| | | | |
|---|---|---|---|
| 1,765,223 | 6/1930 | Ferris | 340/280 X |
| 2,591,288 | 4/1952 | Pitchford | 194/9 T X |
| 2,614,519 | 10/1952 | Paladino | 116/67 R |
| 3,509,527 | 4/1970 | Oakes et al. | 340/51 |
| 3,530,451 | 9/1970 | Devine | 340/280 X |
| 3,778,637 | 12/1973 | Arita | 194/11 X |

FOREIGN PATENTS OR APPLICATIONS
648,203   5/1964   Belgium .................. 194/DIG. 23

*Primary Examiner*—Robert B. Reeves
*Assistant Examiner*—Joseph J. Rolla
*Attorney, Agent, or Firm*—Haseltine, Lake & Waters

[57] ABSTRACT

A workshop installation in which a user can service equipment, machines, vehicles and the like comprising one or more enclosures each having a single access space with a displaceable barrier thereat. The barrier is normally retracted to allow free entry into the respective enclosure via the access space and it is closable after entry into the space. A plurality of tools are supported in tool carriers within the enclosure for utilization by the user within the enclosure. A pre-payment device in the enclosure is coupled to the barrier and the tool supports for allowing removal of the tools after sufficient payment has been made in the pre-payment device corresponding to a predetermined period of time. A barrier locking device is actuated when a tool has been removed from the tool supports. An electrical warning circuit is provided for each enclosure and is activated when the predetermined period of time of the pre-payment device has expired and the tools have not been returned to the tool supports.

13 Claims, 16 Drawing Figures

AUTOMATIC WORKSHOP INSTALLATION

The present invention relates to workshop installations for servicing and repairing equipment, machines, vehicles and the like.

The considerable increase in the number of pieces of electrical, electronic and mechanical equipment ought to have given rise to maintenance and repair services so that the customer need wait only a reasonably short time before getting back a piece of equipment he has left for repair. A further point is that the fall in production costs has not resulted in a reduction in the cost of labor to undertake these repair and maintenance operations.

Now, it is clear that to maintain a machine, a piece of equipment or a vehicle, it is generally only necessary for something to be done to it by a human being and that the portion attributable to parts and spares is very small compared to that played by labor costs.

It is for all these well known reasons that "do-it-yourself" activities are becoming more widespread. However, what these usually involve is assembling something either from prefabricated parts or from existing plans and instructions.

As soon as it becomes a matter of repairing or servicing complicated pieces of equipment such as vehicles, television receivers or household electrical equipment, then there is no practical alternative to going to a professional who has all the necessary tools and equipment at his disposal.

At this point the same disadvantages are met as mentioned above of high labor costs and long waiting times.

The present invention seeks to provide a solution to this problem by making it possible to set up a workshop which can be made available to the public, along with all requisite tools and equipment, on a "self-service" basis, that is to say by leaving the customer entirely free to choose when to service his vehicle or piece of equipment and how long to take in so doing and by putting at his disposal proper professional equipment, all of which he gets for a modest sum which is charged pro rata for time spent.

Accordingly, the invention consists in a workshop installation for checking, servicing and repairing equipment, machines, vehicles and the like, which includes at least one enclosure having a barrier, to which enclosure corresponds a pre-payment device which controls, as a function of time spent, one or more electrical warning circuits and a mechanism for locking the barrier situated at the entrance to the enclosure, the latter containing tools and equipment which are subject to presence detectors which are connected to one or more electrical warning circuits and to the mechanism for locking the barrier.

In order that the invention may be more clearly understood reference will now be made to the accompanying drawings, which show one particular embodiment thereof merely by way of illustrative and non-limiting example, as applied to a workshop intended for the repair and servicing of motor vehicles but it is understood that the invention may be applied to the servicing and repair of any other sort of equipment such as refrigerators, radio and television receivers, household equipment of all types, and so on.

As was stated above, the example chosen to illustrate the invention is that of a repair shop for motor vehicles since it is in this example that the greatest amount of ancillary equipment is used, if only for the movement of vehicles within the installation.

It will be apparent that the installation will be set up inside a building which is divided into a certain number of bays or enclosures which are arranged one beside another and possibly on a number of levels.

In the example chosen it is assumed that the complete installation contains forty eight bays or enclosures, arranged on two levels which are at ground and basement level respectively.

Access is gained to both basement and ground levels through a main entrance in front of which is situated an indicator light consisting of two lamps, one red, one green, which light up, in accordance with universal convention, depending on whether it is possible to proceed or not.

Thus, at the main entrance, the red light is lit if all the bays are occupied or if a vehicle is moving.

When the light is green, it is possible for the motorist to make his way into the installation and check on an indicator board which enclosures are empty and which occupied so that he can make his way to one which is vacant.

The same indicator board may, for example, show the specialized function which has been allotted to certain enclosures by fitting them with particular equipment.

It may thus be envisaged that certain enclosures will be reserved for work on brakes, shock-absorbers and front suspension, while others will be reserved for checking the lights, the carburation of the engine, etc.

The driver now knows if he has to go, say, to the ground floor or basement and which enclosure he has to go to when at the desired level.

So that the installation is as automatic as possible, with the dual object of leaving the customer as free as possible and of incurring the minimum operating costs as far as staff are concerned, each enclosure (or bay) has provided for it a pre-payment device of any known type which counts off elapsed time and gives a warning when the time is exceeded as a function of the number of coins, or tokens bought before entry, inserted in the beginning.

The customer therefore puts in the number of coins or tokens which is indicated for the time which he intends to spend in the bay and drives his vehicle into the bay he has selected.

He thus has a space at his disposal for a predetermined length of time and, in addition, all the tools and equipment he might need. The tools and equipment are, in accordance with the invention, connected mechanically or electrically to an overall surveillance and warning system with the object of preventing theft.

When the work on the vehicle has been completed, the customer returns all the tools to their places and leaves the installation.

Now that overall principle of the installation has been described in very broad terms, a more specific example will be given before the full description of the installation is given.

Having seen the green light at the main entrance, the motorist moves forward to the group of pre-payment devices. He checks on the indicator board which bay he should occupy and whether or not it is vacant.

If the bay is free he puts four coins, for example, in the automatic pre-payment device corresponding to the selected bay and presses a button, the effect of which is to change the indicator light at the main entrance and that at the entrance to the ground level or the basement to red, all of which lasts for a length of time which is calculated to allow him to reach his bay while giving him total freedom of movement.

Had another vehicle been moving at the time the indicator lights would have been red.

Having parked his vehicle in the desired bay, the motorist gets out and lifts a barrier behind his vehicle which pivots about a horizontal axis and which retracts to ground level.

By lifting the barrier the motorists closes a number of circuits which will be described in detail below.

All the tools and equipment are at the customer's disposal for a length of time which is determined, for example, by the number of coins inserted in the pre-payment device.

As soon as the customer takes a tool from a board, the barrier is automatically locked in position so that it will be impossible for the motorist to get out of the bay with the tool.

The barrier will only be unlocked, automatically once again, if all the tools are in place.

It may of course happen that a customer puts into the pre-payment device more coins or tokens than are necessary for the length of time he has actually spent. In this case the customer can recover the number of coins or tokens appropriate to the amount of time remaining and he then returns to the bay to open the barrier by returning it to its horizontal seating and he then goes off with his car.

If on the other hand the amount of time for which provision was originally made proves not to have been enough, it is of course possible for the customer to put in as many more coins or tokens as are needed to allow him to finish the job he has started.

However, it may also happen that the time runs out when the customer is still working. When this happens, a signal indicates that time has been overrun both inside the bay and at a central control station where there is a supervisor on duty. The supervisor has, for example, an internal telephone to allow him to talk to the customer and possibly allow him a few minutes to finish what he is doing and replace the tools. When this is the case the supervisor operates a control button situated on the control panel and allows the barrier to be opened so that the customer can get out again.

It is of course essential to safeguard the tools and equipment placed at the customer's disposal against theft.

For this, it is first of all necessary to make a distinction between the small hand tools (screw-drivers, pliers, wrenches, etc.) and the more costly and complicated pieces of equipment such as drills, measuring devices, etc.

In accordance with the invention, the small handtools are laid out on a board and are held on supports or in seatings the shape of which is clearly reminiscent of that of the tool so that the customer will not have to look for their right place and will not be able to make mistakes.

Level with each seating or tool support is a certain number of electrical contacts which contacts are connected to a general warning device and in addition to a mechanism for locking the barrier so that it cannot be opened unless all the tools are in place and likewise so that a signal is given if a tool is taken from its place without the barrier having first been moved to the closed position.

As to the heavier and more complicated equipment, this of course has to be moved about and at the same time supplied with electricity or compressed air and so on.

To protect such pieces of equipment they are all connected to a board which is locked with a special key and within which terminate two electrical wires which are short-circuited inside the piece of equipment itself so that, if one or both of the wires is cut, an alarm signal is given to warn the supervisory staff.

At the same time the barrier remains locked in the closed position, in the way already described for handtools.

Finally it is necessary for each bay to be provided with electrical current to allow the equipment to be used and provision is made in the installation to supply and cut off the current as dictated both by time spent and by safety requirements, as will be described in detail below.

The various parts of the installation which is taken as an example will now be described in detail.

For greater ease in setting up the electrical circuits involved in the installation as a whole, the various bays are combined into groups and in the example described there are eight groups each embracing six bays.

Figure 1:
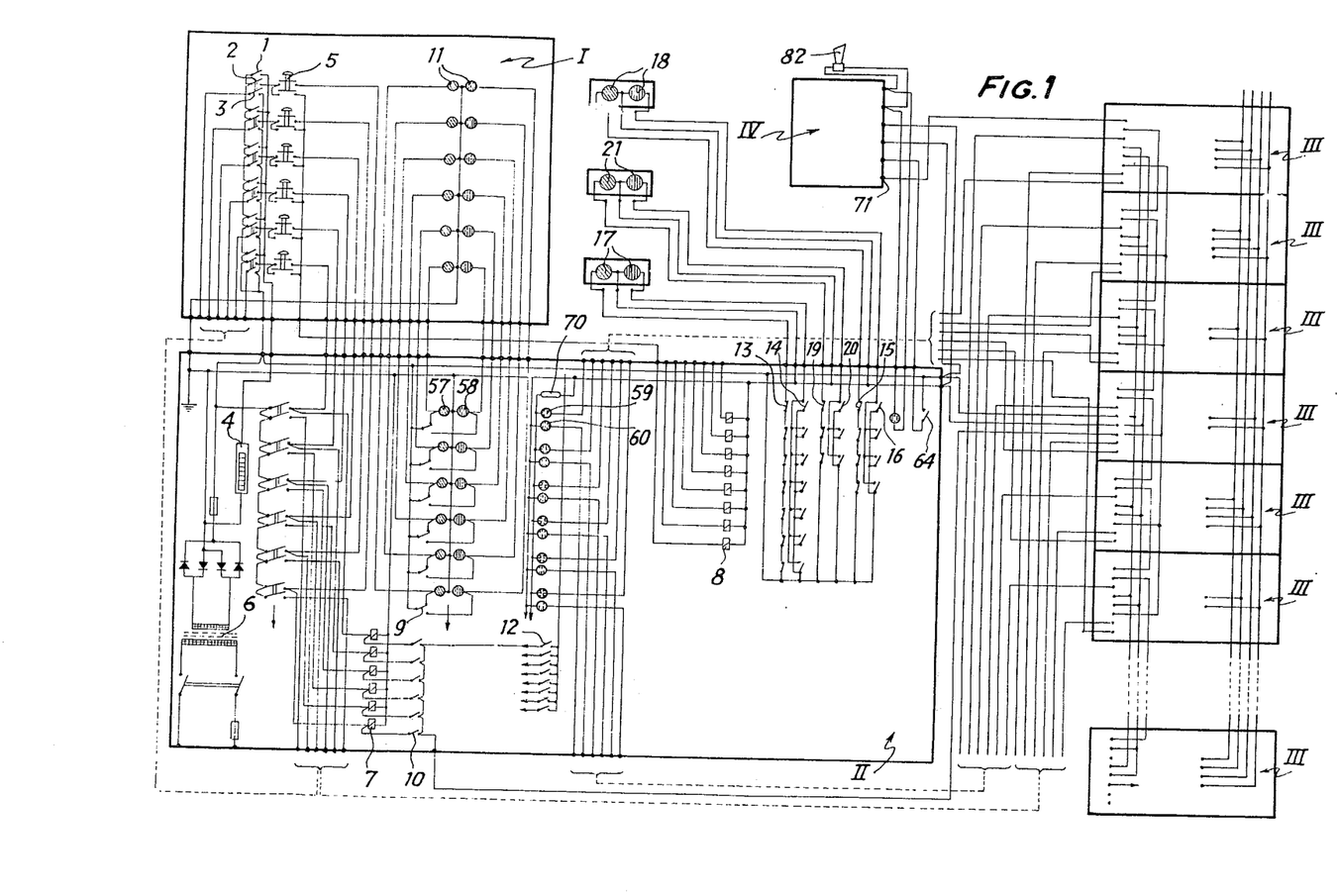
FIG. 1 is a developed diagram of a car repair shop according to the invention.

Referring now specifically to the drawings, in FIG. 1 is shown a developed diagram of the installation in respect of a single group (i.e. six bays) while the circuits for the other bays are merely indicated. The full description will be given for only a single bay though it will be understood that it holds good for each group.

Figure 2:
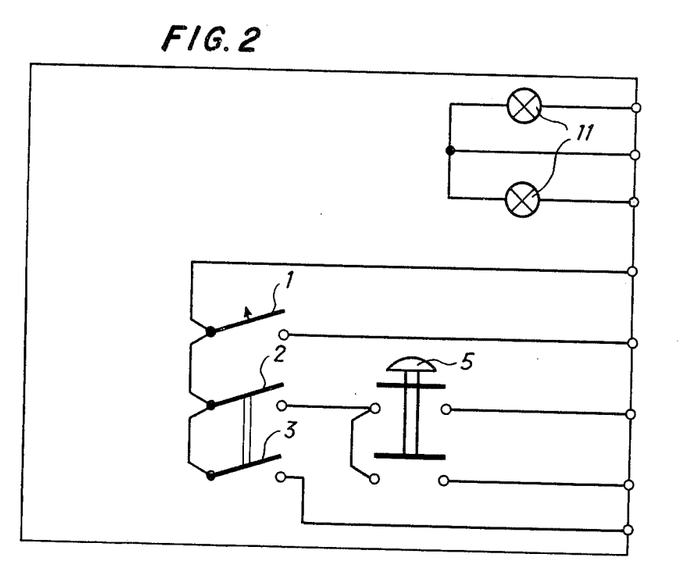
FIG. 2 is a diagram of the electrical circuitry of a pre-payment device used in accordance with the invention.

In FIG. 1, block I corresponds to the specific diagram of the circuitry of the pre-payment devices and this diagram appears in detail in FIG. 2.

Block II represents a circuit diagram for the installation relating to the members located outside the bays, such as the central control station for example.

Figure 4:
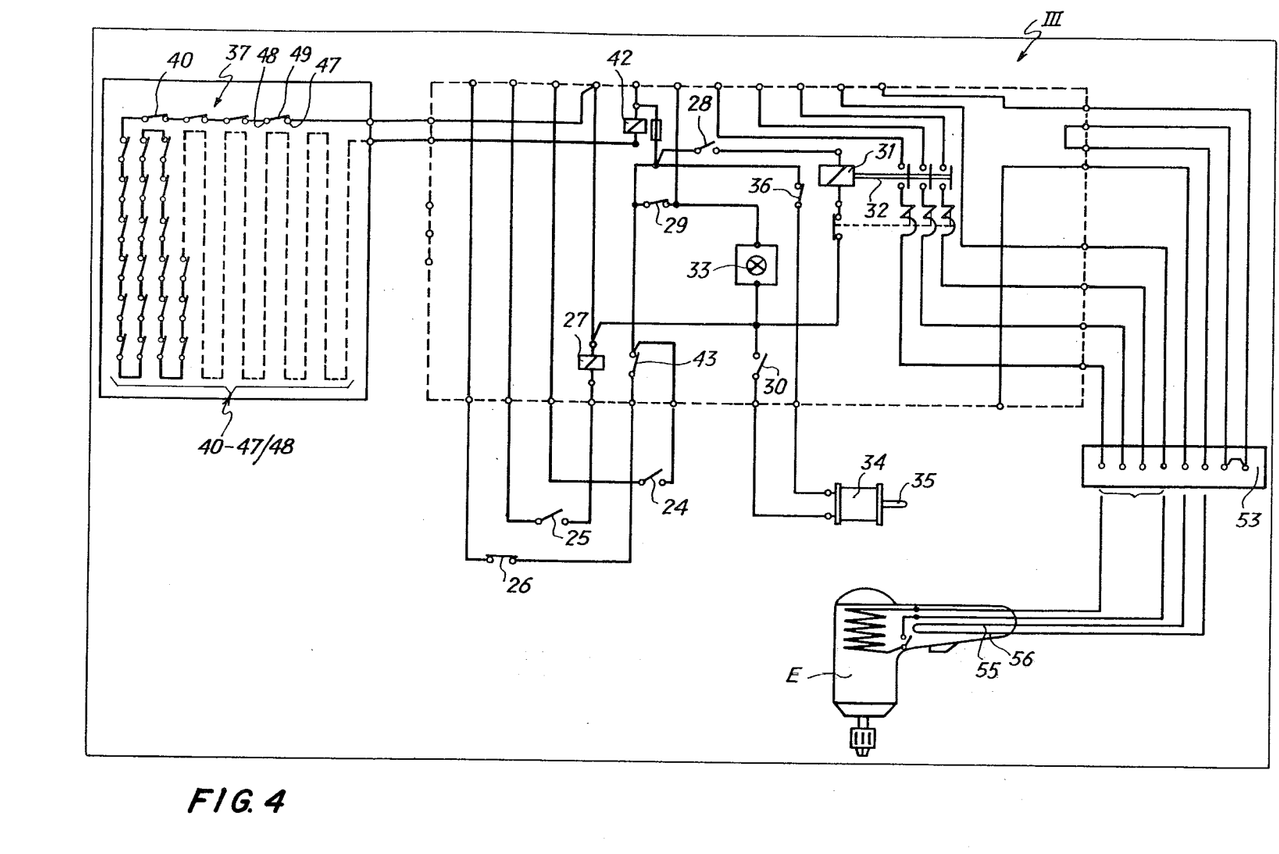
FIG. 4 is a developed diagram of one of the bays of which the workshop as a whole is made up.

Block III corresponds to the circuit diagram for one bay and the circuit is shown in detail in FIG. 4.

It will be seen that in FIG. 1, six blocks III have been shown side by side, these each corresponding to one of the bays in group I, together with a final block III equivalent to the last bay in the last group, the connections between the groups being made in the way which is shown between the last block III in group I and the last block III in the last group.

Figure 10:
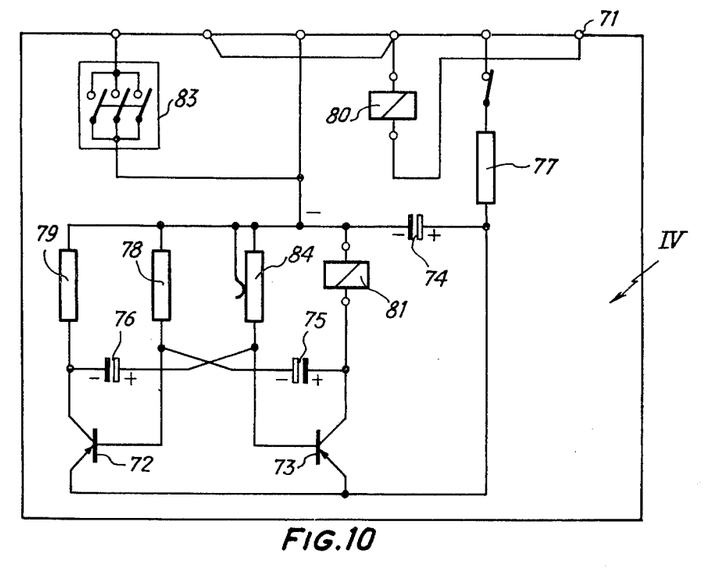
FIG. 10 is a circuit diagram of an alarm system according to the invention.
Figure 11:
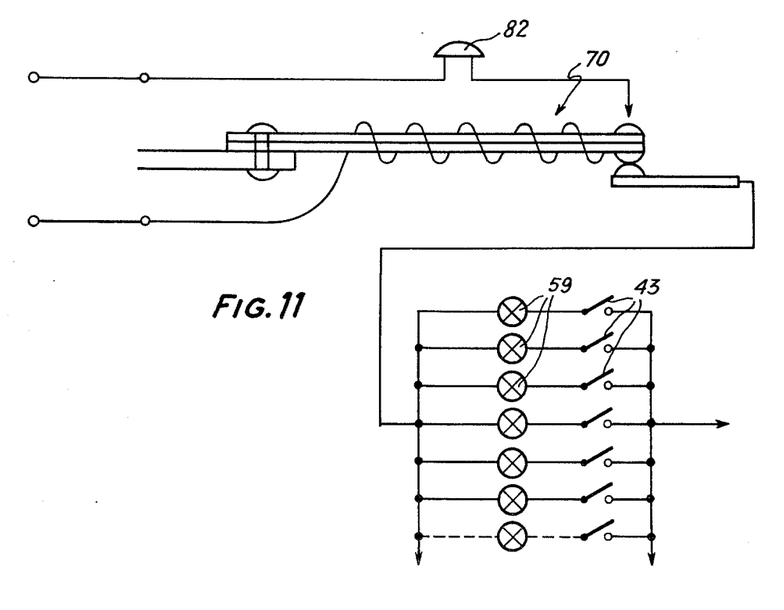
FIG. 11 is a circuit diagram showing a flasher connected to such alarm system.

Finally, block IV in FIG. 1 corresponds to the alarm and warning circuit and is the subject of the detailed circuit diagrams shown in FIGS. 10 and 11.

The customer, who comes in by the main entrance to the installation, sees the green light lit and goes to the group of pre-payment devices, where he inserts a certain number of coins or tokens in the device which corresponds to the selected bay, which in this instance will be bay No. 1 in the first group shown in the drawing.

Inserting a coin or token in the device causes three contacts 1, 2 and 3 to close.

Contact 1 transmits a pulse to a recording counter 4 which is situated in an office belonging to the management of the operation and it does this each time a coin or token (which is equivalent to one unit of time) is inserted.

The advantage of this centralized accounting system is not only that it allows the operation to be supervised and managed but also that it allows indisputable figures to be supplied to, for example, the tax authorities.

Contacts 2 and 3 remain closed for a length corresponding to the number of coins or tokens put into the device.

Contacts 2 and 3 are linked so as to operate together. Contact 3 enables a low voltage (24 volts for example) from a transformer 6 to be delivered to contact 2 and from there to a push button 5.

At this point the customer actuates push-button 5 to enable him to occupy the selected bay and button 5 closes the circuits which excite relays 7 and 8.

Relay 7 moves two contacts 9 and 10 the first of which closes the supply circuit to signal lamps 11 which indicate occupied bays and which are located both on the pre-payment device and on the central control panel, as will be explained below, the green light being switched off at this time and the red light turned on.

Contact 10 closes and switches relay 7 through to a contact 12 which closes the low-voltage circuit for a relatively short period such as a minute, which is equivalent to the time allowed to the customer to occupy the selected bay, this being done to speed up traffic flow because the red indicator lights are lit all during this time. It should be noted that contacts 12 of relay 8 are of the type which can adjust to hold on for 30 seconds to 2 minutes, for example, so as to allow the particular conditions in the building to be adapted to.

Relay 8 controls the contact 12 and the latter thus holds in the relay 7 which corresponds to the selected bay for a time period such as one minute.

In addition, relay 8 actuates contacts 13 and 16 which change from green to red the indicator lights 17 and 18 which are situated at the main entrance and the entrance to the ground floor respectively, it being assumed that bay 1 is situated at ground level.

Had the selected bay been situated at basement level, relay 8 would have closed contacts 13 and 14 but instead of contacts 15 and 16 it would have closed the contacts 19 and 20 which correspond to the indicator lights 21 situated at the entrance to the basement.

Contacts 13, 14, 15 and 16 remain operative for a minute (in the example chosen) which is equivalent to the amount of time allowed to the customer to occupy the selected bay.

When this stage has been arrived at, it can be seen that inserting the coins and actuating the press-button 5 has allowed the indicator lights to be controlled, the coins registered, and the bay selected by the customer prepared for him.

Figure 3:
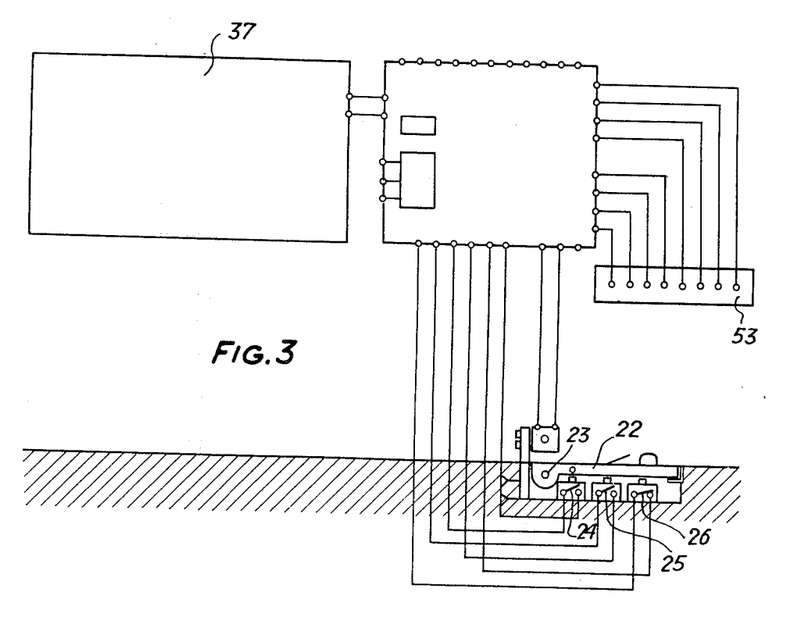
FIG. 3 is a complementary diagram to the previous diagram and shows the electrical connections between an actual service bay and a barrier which gives access to the bay.

The customer now drives his car into the bay 1 until it has passed a barrier 22 which is mounted to pivot on a shaft 23 and which can take up either the position shown in FIG. 3, i.e. retracted into the ground, or an erect, vertical position.

As can be seen from FIG. 3, in the lowered position, i.e. the open position, the barrier 22 acts on three contacts 24, 25 and 26 of which 24 and 25 are open and 26 is closed.

When the customer lifts the barrier 22 the three contacts 24, 25 and 26 are changed over.

Contact 24 closes the low voltage circuit to relay 7, which thus remains closed all the time the bay is occupied.

Contact 25 closes a low voltage circuit which runs to a relay 27 (FIG. 4) situated in the control panel in the bay.

Contact 26, which was closed originally, is now opened and breaks the alarm and warning circuit which is to be described later.

When relay 27 is excited as a result of contact 25 closing, it actuates three contacts 28, 29 and 30. Contact 28 closes the low-voltage supply circuit to relay 31 and the latter operates a contact-breaker 32 which in closing closes the circuit which supplies the pieces of equipment with normal mains voltage (220 volts for example).

The contact 29, which was closed originally, opens and, because of this, cuts off the supply to an indicator lamp 33 which indicates that the length of time corresponding to the number of coins inserted in the pre-payment device has been exceeded. This lamp 33 is located inside the bay so as to warn the customer but, as will be explained later, the central control station also has a lamp of the same type as 33 so that the occupancy of the bay can be checked on.

The closure of contact 30 causes the supply circuit to be closed to an electromagnet 34 which has a plunger 35 which forms a member for locking the barrier 22 in the closed position, i.e. the erected position.

However, plunger 35 will only take up its active position if a contact 36 is closed at the same time as contact 30, as will explained below.

At this stage it can be seen that the customer will now have occupied the selected bay and that the various circuits are made which make it possible for him to make use of all the tools and equipment in the bay.

Figures 5A, 5B:
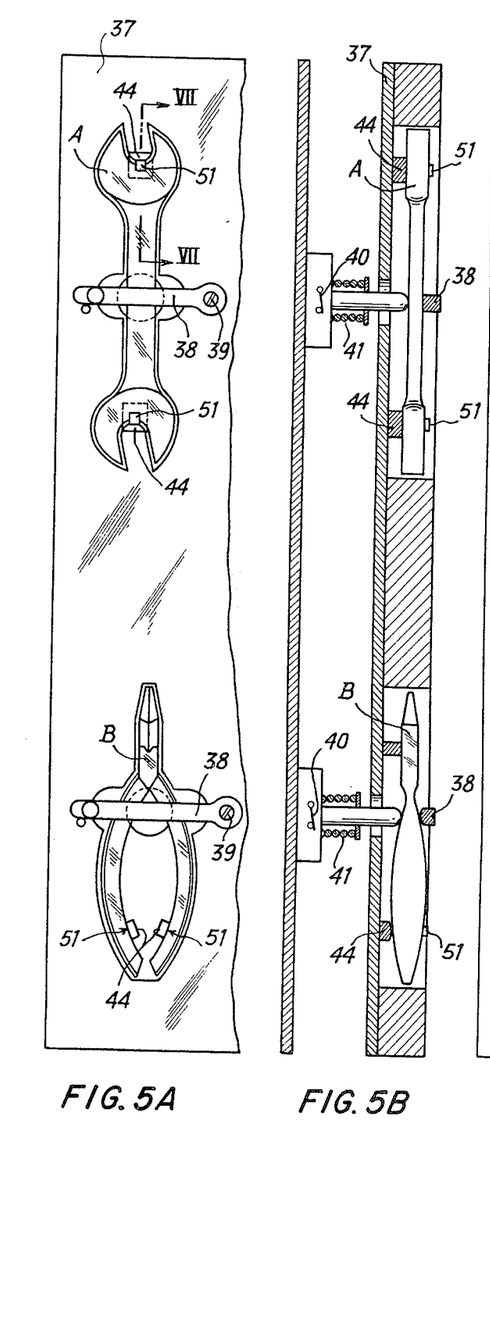
FIGS. 5A to D are diagrams of a board on which the small tools are laid out.
Figure 5C:
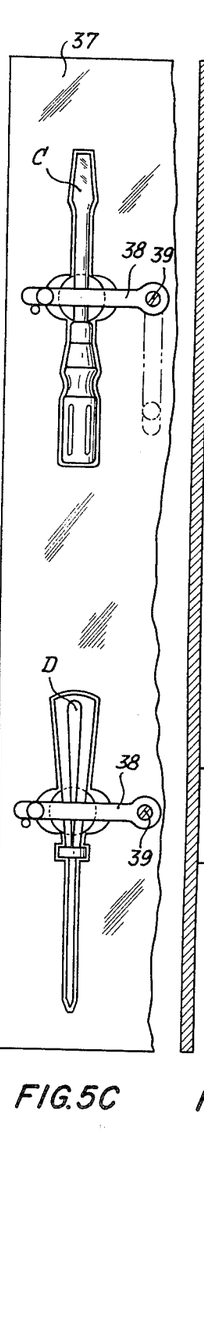
Figure 5D:
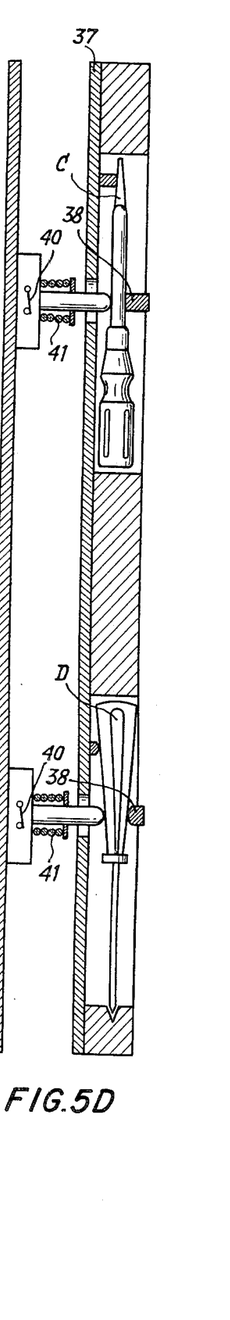

Inside the bay there is in fact a board 37 which contains seatings, cut-outs or other indications of the shape of hand-tools such as a flat wrench A, a pair of pliers B, a screw-driver C, a Phillips head screw-driver D and so on (FIG. 5).

Figures 6, 7:
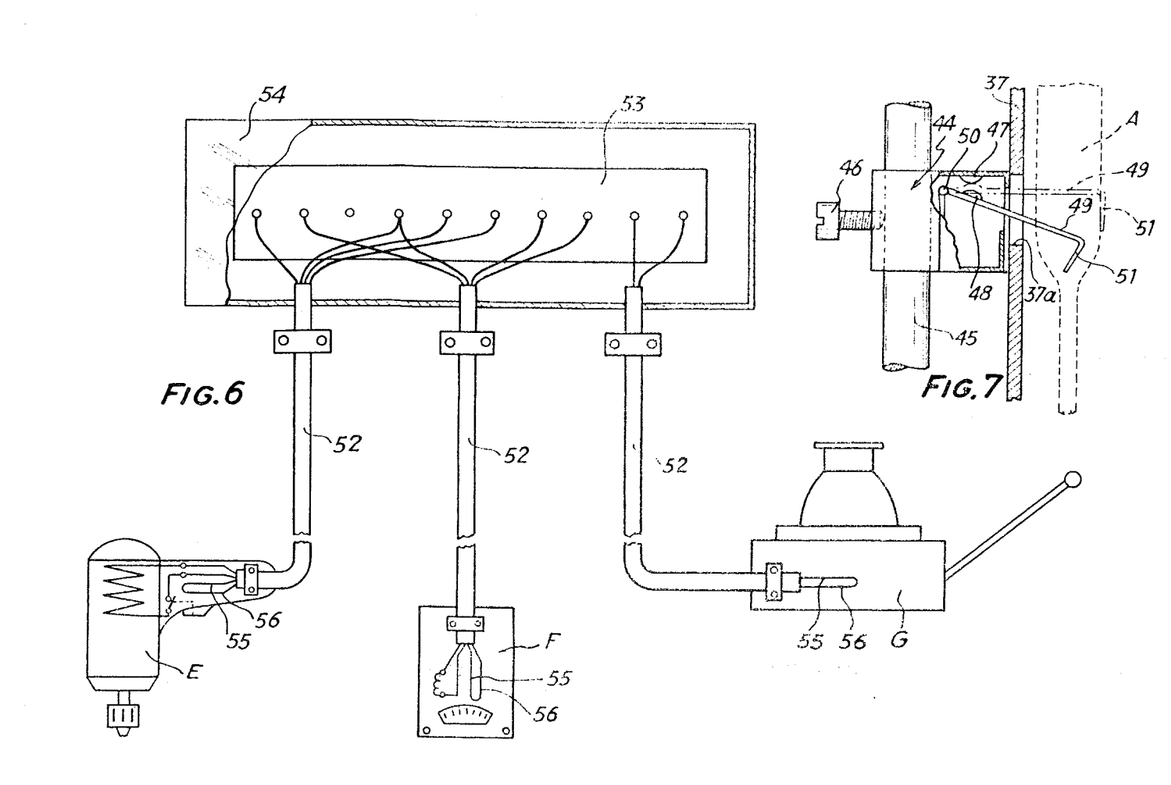
FIG. 6 is a diagram showing how the movable equipment is connected to the alarm and electric supply systems.
FIG. 7 is a diagrammatic cross-section, to an enlarged scale, taken along line VII—VII of FIG. 5, FIGS. 8 and 9 are a side-view and a plan view respectively of a central control station according to the invention.

The bay also contains items of equipment such as a drill E, a checking device F, a pneumatic jack G, etc. (FIG. 6).

To reach the hand tools, the customer turns a small bar 39 mounted on a shaft 39 and takes out the tool which he wants.

In so doing, he allows a contact 40 which is biased towards the open position by a spring 41 to open and to break a low voltage circuit which runs to a relay 42 (FIG. 4).

It can be seen that each tool has a corresponding contact 40 and that all the contacts 40 are connected in series so that any one of them will open the circuit to relay 42. In the open position relay 42 closes two contacts which are respectively a contact 36 which is fitted in the circuit of the electromagnet 34 described above, and a contact 43 fitted in the alarm and warning circuit which will be described later.

In addition to the contacts 40 situated opposite each tool it is also possible to provide contact switches 44 which are connected in series with contacts 40 and which are situated opposite a part of the tool which is of a characteristic shape (FIG. 7).

Referring to FIG. 7, it can be seen that behind the board 37 and at right angles to the tool seatings or holders there is situated an array of rods 45 on which contact switches 44 are slidably mounted so that their position can be adjusted, the switches being clamped in position by means of a screw 46 for example. Contact switch 44 contains a fixed contact 47 and a contact 48 which is mounted on a spring blade 49 which is folded over at 50 and is biassed downwards. Contacts 47 and 48 are connected to electrical wires and are connected in series with contacts 40 (FIG. 4). Blade 49 ends in a hook 51.

The use made of contact switches 44 is as follows:

Their position along rods 45 is adjusted so that they are situated opposite a particular, characteristic part of the tool. In this instance the open ends of the flat wrench A have been chosen.

Also, board 37 is provided with openings 37a, through one of which the blade 49 passes to reach the accessible face of board 37. To replace the wrench it is necessary to lift blade 49 to move it to the position shown in chain lines and by this means the two contacts 47 and 48 are brought together to close the circuit. At the bottom of the wrench A is situated a contact switch 44 which is symmetrical with that just described, with the result that replacing wrench A implies depressing blade 49 or the lower contact switch 44 and lifting blade 49 of the upper contact switch 44.

Conversely, removing the tool causes the blades 49 to return elastically and the contacts 47 and 48 to separate.

Since all the contacts 40 and 44 (47/48) are in the same alarm and warning circuit which is to be described later, it is evident that the circuit will only be correctly made and prevent an alarm or warning being given if all the contacts are closed, with the result that a valuable tool cannot be replaced with some simple object which acts only on contact 40 since it is necessary for all the contacts 40 and 44 and 47/48 to be closed together, and since the relative positions of contact switches 44 are such that they correspond to the geometrical configuration of the tool, the bay will only be considered in order if the actual tools are in their right places.

As to the movable pieces of equipment, these are connected by flexible cables 52 to a board 53 which is closed by a cover 53 which is locked with a key so that the customer cannot open it and gain access to the terminals to which the electrical leads on the pieces of equipment run.

In addition to the electrical supply cables for the normal operation of the equipment, each piece of equipment also has two wires 55 and 56 which are shortcircuited inside the piece of equipment and are situated in the alarm circuit.

As long as wires 55 and 56 are intact the equipment operates normally and is freely available to the customer along with the hand tools.

Before the alarm and warning circuits are described there will now be described the way in which the installation functions in the normal case when, having done all the work required on his vehicle, the customer restores all the hand tools he has used to their proper positions and leaves all the pieces of equipment and their wires 55 and 56 unharmed.

When all the hand tools are in place, all the contacts 40 and 44 (47/48 (44)) are closed with the result that relay 42 changes over and operates contact 43, which opens. Meanwhile contact 26 is still open since barrier 22 has not been lowered to the open position.

Thus, the warning circuit is not actuated.

Relay 42 also causes contact 36 to open with the result that core 35 of electromagnet 34 unlocks barrier 22 and the latter thus becomes free to move.

The customer then lowers the barrier 22, the effect of which is to cause contact 24 to open, with the result that relay 8 (FIG. 1) is no longer excited and the red lamp 11 which indicates that the bays are occupies goes out and the corresponding green lamp comes on, which indicates that the bay is now free.

Lowering the barrier 22 also causes contact 25 to open and break the current supply to board 53.

At the same time contact 29 closes to make the supply circuit to the lamp 33 which indicates "Time exceeded". It should be noted that the lamp 33 in the bay and the corresponding lamp on the central control panel are always lit when the bay is vacant.

Still as a result of barrier 22 being lowered into the ground and contact 25 opening, contact 30 opens and makes it impossible for plunger 35 to lock barrier 22.

Finally, in addition to causing contacts 24 and 25 to open, lowering barrier 22 also causes contact 26 to close, which contact would have caused the warning circuit to operate if contact 43 had not already been open, which is the case on the present assumption.

The customer can then get his car out of the bay without hindrance.

The description above assumes that electromechanical contacts are employed.

A simpler and more economical solution is to use so-called "Reed" switches which consist of a sealed, evacuated capsule in which two flexible strips face one another. The two strips are held apart by their intrinsic elasticity and come together, thus closing the circuit, when a magnet is moved up to the capsule.

According to the invention, each tool is magnetized or carries one or more magnetized pieces so that it will cause the Reed switches to close when it is replaced.

Figure 8:
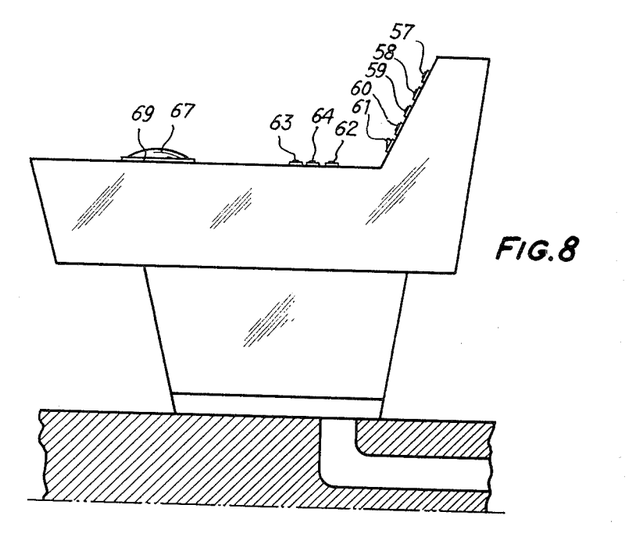
Figure 9:
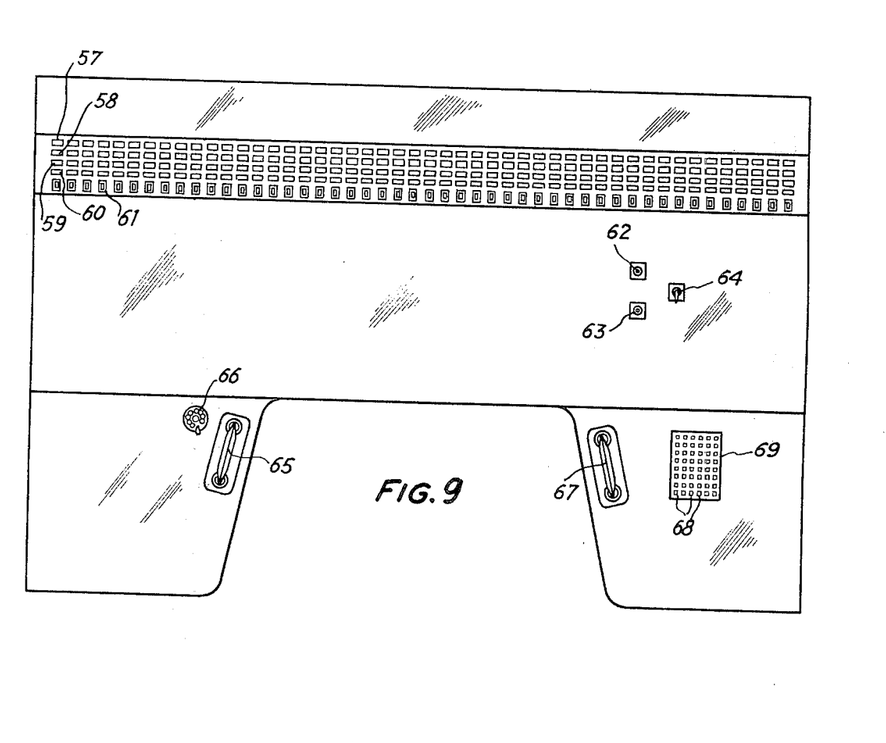

Referring to FIGS. 8 and 9, it can be seen that the central control station may be formed by a desk in front of which the supervisor is seated so that he can watch the forty eight sets of lamps, each of which corresponds to one bay.

The upper lamp 57 and that 58 situated immediately below it are situated behind windows which are respectively green and red and correspond to the indicator lamps 11 which signal whether the bay is occupied or empty.

Lamp 59, which is situated behind a yellow window for example, lights up and flashes when an attempted theft occurs, in a manner which will now be described.

Lamp 60, which is situated behind a blue window for example, corresponds, as already mentioned, to the lamp 33 situated in the bay and indicates, when it lights up, that time has run out.

Below lamp 60 is situated a press-button 61 which the supervisor can use to unlock the barrier 22 even though time has been overrun, as will be seen later.

On the desk proper are two push-buttons 62 and 63 which enable the controller respectively to switch on and switch off the supply of electrical current to the installation as a whole.

A button 64 also allows the alarm system to be operated manually for the purpose of cutting it out once it has been put into action.

At one side of the desk may be situated a telephone handset 65 and a dial 66, while on the other side of the desk is a handset 67 by means of which the controller can speak to the customer in any of the bays via a loud-speaker after having operated a push-button appropriate to the required bay, all these push-buttons 68 being grouped together on a board 69.

The alarm has two different circuits so as to bring to notice two phenomena of differing importance.

The first is the mistake or minor dishonesty of opening the barrier 22 so as to get out when at least one tool is not in its place.

The second is the theft of a valuable piece of equipment which is indicated by wires 55 and 56 being cut.

In the first case the switches 40 and/or 44 associated with the tool-board 37 are actuated either due to the fact that the customer has simply forgotten to raise the barrier 22 or because some dishonest individual is trying to make off with the tools without occupying the bay. In this case there is a "simple alarm". Relay 42 closes contact 43 and the latter operates a flasher relay 70 which operates on the fullwave principle and which operates on the one hand lamp 59 and on the other an audio alarm of any known type (not shown) which is located on the main control desk described above. Lamp 59 and the audio alarm give an exact indication of the number of the bay in which the act of dishonesty or the mistake is being perpetrated.

In the second case, the alarm network has to do with board 53 only. The circuit in question is in effect activated only as a result of the said wires appropriate to the piece of equipment involved being cut.

The alarm block IV (FIGS. 1 and 10) is then brought into action by a contact which is connected to point 71. In the example described, the block contains two transistors 72, 73, three electrolytic capacitors 74, 75, 76, three resistors 77, 78, 79 and two relays 80, 81. All these components are of known types and control the operation of a siren 82 by means of a relay 83.

What is more, since the theft is a serious one, the thief must be prevented from escaping. It is for this reason that relay 80 puts electromagnet 34 in circuit, not to act on the plunger 35 but rather to excite a power winding which draws barrier 22 upwards, the latter rising automatically and locking to prevent the vehicle in the bay from leaving. Naturally, if the theft takes place while the barrier 22 is raised and locked, it remains so.

The only difference from normal operation lies in the fact that the barrier experiences the magnetic attraction from electromagnet 34.

The length of time for which relay 83 remains in action is controlled by a potentiometer 84 which allows the time for which siren 82 operates to be adjusted. The alarm can in any case be switched off by button 64 and is only switched on again when the cause of the alarm has been remedied.

Furthermore, so that the installation can accept vehicles for all sorts of repair it is necessary to provide lifting ramps or pits, without which certain parts of the vehicle are awkward or even impossible to get at.

However, this being so, it is necessary to ensure that they can be used with safety since by definition there is no service staff except those who are there to provide instructions or act as supervisors.

Figure 12:
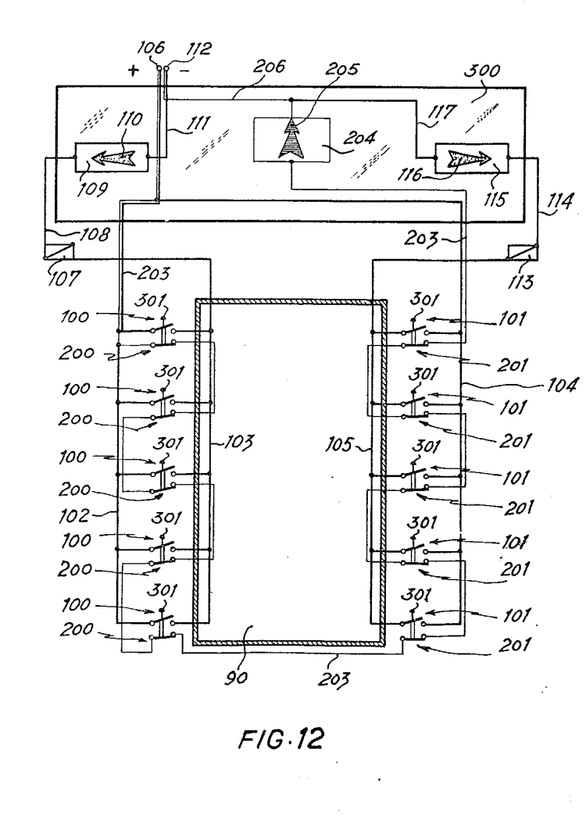
FIGS. 12 and 13 are diagrams showing how a vehicle may be guided automatically over a pit or onto a lifting ramp in accordance with the invention.

This is achieved as follows:

Referring to FIG. 12 there is seen a pit 90 situated in the center of one of the bays which has already been described above and which therefore need not be further described here.

On either side of the pit 90 are situated, on the ground, two series of contacts 100 and 101 which are connected in parallel across two pairs of wires 102 and 103 on the one hand, and 104 and 105 on the other hand.

Wires 102 and 104 are both directly connected to a terminal 106 belonging to the electrical circuit.

Wire 103 runs to a flasher unit 107 which is connected by a wire 108 to an indicator 109 which contains an electrical bulb behind a window 110 which is in the shape of an arrow pointing towards the left and which is advantageously red in color. A wire 111 connects indicator 109 to the second terminal 112 of the electrical circuit.

In an arrangement symmetrical with that described above, wire 105 leads to a flasher unit 113 which is connected by a wire 114 to an indicator 115 identical to the previous indicator but the arrow-shaped window of which points to the right. A wire 117 connects indicator 115 to terminal 112.

The rows of contacts 100 and 101 are separated by a distance less than track of the narrowest-track vehicle likely to use the installation, so that, if a vehicle is correctly lined up in front of the pit, its wheels should not touch contact switches 100 or 101. Since the latter are permanently open, neither the left-hand circuit (contact switches 100) nor the right-hand circuit (contact switches 101) is closed and no current flows.

If on the other hand the vehicle is badly lined up too close to the pit 90 either on the right or left hand side, one of the wheels will operate one of the contact switches 100 or 101. As it is depressed the contact switch closes the circuit and current flows. In this way the bulb of the appropriate indicator (either 109 or 115) will light up and flash under the prompting of its associated flasher unit (either 107 or 113). The driver will thus be warned that he is too close to the pit 90 and that he should turn his wheels in the direction indicated by the illuminated arrow (either 110 or 116).

Two other sets of contact switches 200 and 201 are inserted between contact switches 100 and 101. Unlike the latter, contact switches 200 and 201 are all connected in a single series along a wire 203 which is connected to terminal 106 and which also connects the last contact switch 200 to the first contact switch 201, in series likewise. Following the last contact switch 201, wire 203 leads to an indicator 204 which contains an electric bulb behind a window 205 which is in the shape of an upward-pointing arrow which is advantageously green in color. Indicator 204 is connected by a wire 206 to terminal 112.

Contact switches 200 and 201 are all closed in the rest position, so that the circuit is made. Illuminated arrow 205 is thus permanently lit.

If the vehicle is properly lined up, none of the contact switches is operated since they are all in line and, as stated above the distance between the two rows is less than the track of the vehicle.

The driver thus sees the lighted green arrow 205 in front of him all the time, this indicating that his approach is correct and that he can drive forward.

If the vehicle diverges from the correct line and touches any one of the contact switches the operation of the latter both causes the first circuit to be closed (one of the lateral flashing arrows 110 and 116 is lit) and the second to be opened (arrow 205 goes out).

In practice the three indicators 109, 115, 204 are grouped together on a panel 300 which is situated vertically at a height where it can be seen by the driver.

To ensure that contact switches 100 and 200 on the one hand and 200 and 201 on the other operate absolutely simultaneously, the two contacts forming each pair are ganged. They are thus operated at the same time by means of a button (or pedal) 301.

Figure 13:
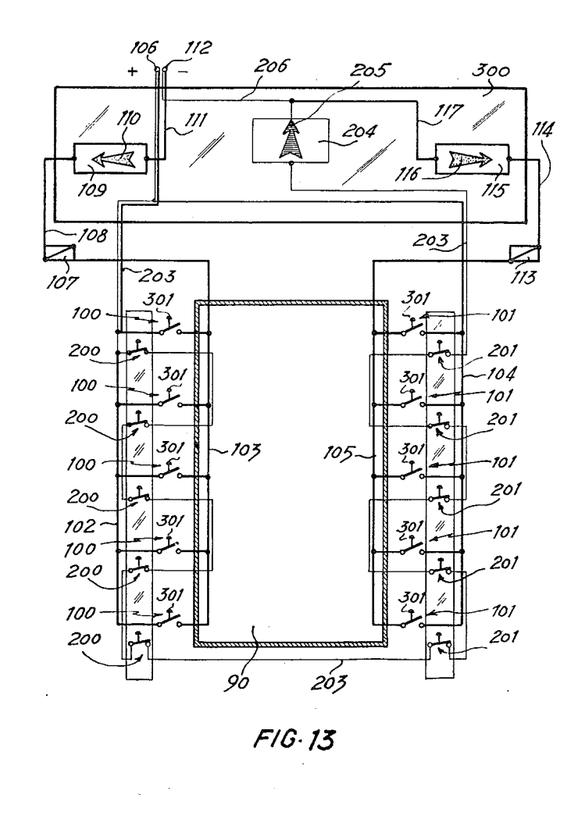

Referring now to FIG. 13, it can be seen that the installation is made up of the same members as before, but that in this case contacts 100 and 101 are lined up with one another while at the same time they are staggered sideways in relation to the contacts 200 and 201 which are likewise lined up with each other.

In this modification contacts 200 and 201 are situated under rails or platforms 302 of the type used on lifting ramps. The contacts are shown here in the closed position, which assumes that the weight on the vehicle is being exerted on the rails and that the vehicle is properly positioned. The green arrow 205 is lit.

If the vehicle moves towards the pit 90, one of its wheels will touch one of contacts 100 and 101, which will cause either arrow 110 or arrow 116 to flash.

Contacts 100 and 101 may likewise all be subject to the movement of a rail either vertically or laterally. The rows of contacts may, as is known per se, be replaced by suitable spaced elongated linear members which cause a circuit to close whenever the vehicles moves onto them at any point along their length.

Besides switching the illuminated indicators on or off, the contacts may control the operation of one or more pieces of equipment. Where a pit is concerned, the piece of equipment may be a covering panel which is retracted by a motor. In the case of a lifting ramp, the piece of equipment may be the ramp itself which can only be moved on condition that one or more contacts have been actuated by a correctly positioned vehicle.

What I claim is:

1. A workshop installation in which a user can service equipment, said installation comprising at least one enclosure having a single access space and a displaceable barrier at said access space, said barrier being normally retracted to allow free entry into said enclosure via said access space and being closable after entry into said enclosure, means in said enclosure for removable support of tools to be utilized by the user within the enclosure, a pre-payment device in the enclosure coupled to the barrier and the tool support means for allowing removal of tools after sufficient payment has been made in the pre-payment device corresponding to a pre-determined period of time, at least one electrical warning circuit, means for locking said barrier in the closed position thereof, and presence detector means for detecting the presence of the tools in the tool support means, said presence detector means being coupled to said pre-payment device and to said barrier locking means and electrical warning circuit for activating the barrier locking means when a tool is removed from the tool support and for closing the electrical warning circuit when the pre-determined period of time of the pre-payment device has expired and the tools have not been returned to the tool support means.

2. An installation according to claim 1, wherein a plurality of enclosures and a central control station are provided at which station the electrical warning circuits terminate, further circuits terminating at said control station for controlling and operating the means for locking the barriers and additional circuits terminating at said control station for monitoring the pre-payment devices.

3. An installation according to claim 1, wherein the presence detector means comprises circuit breakers situated on the tool support means and automatically operated in one direction when a respective tool is in place and in the opposite direction when the tool is removed, said tool support means comprising a plurality of tool supports each accepting a respective single, specific tool, all the circuit breakers being connected in series to said warning circuit.

4. An installation according to claim 3, wherein at least some of said circuit breakers are of the dynamometric type and include operating mechanisms which can only be actuated if the force which acts on them is equivalent to the weight of the tool for which they are adjusted, said circuit breakers being positioned at the base of the respective tool supports so that a tool which is put in place rests on a respective circuit breaker and actuates it by its weight.

5. An installation according to claim 3, wherein a plurality of circuit breakers are provided for each single tool and said circuit breakers are arranged to conform to the configuration of the tool.

6. An installation according to claim 5 comprising fixed guides supporting the circuit breakers for movement so that they can be adjusted in position.

7. An installation according to claim 1, wherein the presence detector means includes two flexible wires and a sheath in which the wires are connected to a tool in which they are short-circuited, said wires being connected to said warning circuit which is actuated when at least one of said wires is cut.

8. An installation according to claim 1, further comprising electrical power supply means connected in said enclosure for operating the tools and equipment, said power supply means including a circuit controlled by at least one of the pre-payment device and the barrier.

9. An installation according to claim 8, wherein the circuit of the power supply means includes control circuit breakers fitted in the control circuit of a contact breaker which is itself in the circuit of the power supply means.

10. An installation according to claim 1, wherein said warning circuit includes at least one lamp situated in the enclosure and a lamp situated at a central control station, said warning circuit including an actuator contact switch which is controlled by the pre-payment device when the pre-determined time has elapsed after payment to the pre-payment device.

11. An installation according to claim 10, wherein said pre-payment device includes means for adjusting the said pre-determined period of time.

12. An installation according to claim 1, wherein said warning circuit includes a warning device and at least one relay which actuates said warning device when the presence detector means is activated.

13. An installation according to claim 1, wherein said warning circuit contains an eletromagnet which is excited when the presence detector means is activated upon removal of a tool, said electromagnet being situated opposite the barrier so as to move it to closed position by magnetic attraction, said barrier locking means being actuated by said warning circuit when the barrier has reached its closed position.

* * * * *